United States Patent [19]
Sakata

[11] Patent Number: 6,164,405
[45] Date of Patent: Dec. 26, 2000

[54] STEERING GEAR BOX MOUNTING STRUCTURE

[75] Inventor: Katsutoshi Sakata, Toyota, Japan

[73] Assignee: Toyota Jidosha Kabushiki Kaisha, Toyota, Japan

[21] Appl. No.: 09/190,611

[22] Filed: Nov. 12, 1998

[30] Foreign Application Priority Data

Nov. 14, 1997 [JP] Japan ................................. 9-313872

[51] Int. Cl.$^7$ .............................. B62D 3/00; F16F 1/387
[52] U.S. Cl. .................... 180/400; 280/93.515; 248/638; 267/141.3
[58] Field of Search .................... 180/400, 417, 180/421, 422, 423, 444; 280/781, 93.514, 93.515; 248/638; 267/141.2, 141.3, 141.4, 141.5

[56] References Cited

U.S. PATENT DOCUMENTS

| | | | |
|---|---|---|---|
| 3,869,139 | 3/1975 | Gage | 280/96 |
| 4,634,135 | 1/1987 | Nakata et al. | 280/90 |
| 4,823,898 | 4/1989 | Ogura et al. | 180/408 |
| 5,597,049 | 1/1997 | Bruehl et al. | 180/400 |
| 5,879,026 | 3/1999 | Dostert et al. | 280/781 |

Primary Examiner—Kevin Hurley
Attorney, Agent, or Firm—Oliff & Berridge, PLC

[57] ABSTRACT

A steering gear box mounting structure has a flexible support device for mounting a steering gear box to a vehicle body member and a flexible support device mounting portion for mounting the flexible support device to the steering gear box. The flexible support device is composed of an outer sleeve, an inner sleeve and an elastic body. The outer sleeve is conically shaped in its both axial end portions and is cylindrically shaped in its center portion. The inner sleeve is partially conically shaped in its axial end portions and is cylindrically shaped in its center portion. The elastic body is interposed between the outer and inner sleeves with a hollow space left therebetween. In the flexible support device, the outer sleeve is provided with an inclined surface inclined with respect to a direction perpendicular to the axis of the outer sleeve. Hence, the outer sleeve is vertically displaced relative to the inner sleeve in accordance with loads applied to the vehicle in left-to-right directions, thus making it possible to obtain a variable toe curve. The hollow space ensures a certain linear range.

12 Claims, 14 Drawing Sheets

CIRCUMFERENTIAL RENGE OF SECOND HOLLOW SPACE

CIRCUMFENTIAL RENGE OF SECOND HOLLOW SPACE

FRONT SIDE OF VEHICLE

LEFT SIDE OF VEHICLE

RIGHT SIDE OF VEHICLE

CIRCUMFERENTIAL RANGE OF SECOND HOLLOW SPACE

CIRCUMFERENTIAL RANGE OF FIRST HOLLOW SPACE

REAR SIDE OF VEHICLE

STEERING GEAR BOX MOUNTING STRUCTURE

INCORPORATION BY REFERENCE

The disclosure of Japanese Patent Application No. HEI 9-313872 filed on Nov. 14, 1997 including the specification, drawings and abstract are incorporated herein by reference in its entirety.

Background of the Invention

1. Field of the Invention

The present invention relates to a structure for mounting a vehicular steering gear box to a vehicle body member via flexible support devices.

2. Description of Related Art

When a vehicle travels straight on a road, it is required to maintain its stability under disturbances transmitted from the road and is expected to demonstrate a neutral steering tendency. When the vehicle turns, there are some cases to be expected, from the standpoint of operational stability, to demonstrate an understeer tendency wherein the vehicle has a large turning radius for its steering angle. Therefore, it is desirable to change suspension alignments depending on whether the vehicle travels straight or turns, so as to make a toe curve variable. In this connection, Toyota Technical Publication No. 6478 (published on Dec. 24, 1996) discloses a "steering gear box mounting structure", which will be described hereinafter.

FIG. 15 is a perspective view showing that a steering gear box 140 in the aforementioned mounting structure is mounted to a vehicle. The steering gear box 140 is composed of a steering gear mechanism (for example, a pinion shaft having a pinion gear, a rack bar having a rack gear, and the like), a gear housing supporting the mechanism, and the like. The steering gear box 140 is coupled to a rear portion of a knuckle 20 via a tie rod 130. The knuckle 20 rotatably supports a wheel 10 (a front wheel in this case). A vehicle suspension mechanism is composed of a lower arm 60, a strut 160, and the like. The strut 160 is disposed between an upper end of the knuckle 20 and a vehicle body member 70. The strut 160 is expandable in the directions if the axis thereof. The knuckle 20 is connected at its front portion to one end of a lower arm 60 for rotational movements about a king pin shaft, which is not shown in the drawing. The lower arm 60 is connected at the other end thereof to the vehicle body member 70. As shown in FIG. 16, the steering gear box 140 is mounted to the vehicle body member 70 via flexible support devices 150, each of which is incorporated in a flexible support device mounting portion 142.

FIG. 17 is a plan view of the flexible support device 150, and FIG. 18 is a sectional view taken along line XVIII—XVIII in FIG. 17. The flexible support device 150 is composed of a cylindrical outer sleeve 152, a cylindrical inner sleeve 151, and a rubber portion 157 interposed between the inner and outer sleeves 151, 152. The rubber portion 157 includes a hollow space 154 (also referred to as a currant portion) where no rubber material exists. As shown in FIG. 18, plastic protrusions 158, 159 are formed on an outer wall surface of the inner sleeve 151 and an inner wall surface of the outer sleeve 152 respectively. The rubber portion 157 is filled with rubber in such a manner as to cover the plastic protrusions 158, 159 and forms V-shaped surfaces 157a, 157b with gentle slopes. The plastic protrusions 158, 159 are vertically offset from each other at their leading end portions.

The operation of the steering gear box 140, which is supported by the flexible support devices 150, will be described hereinafter based on the flexible support device 150 located on the right side in FIG. 16. (Because of symmetrical arrangement, the flexible support device 150 on the left side operates in the same manner.) When the vehicle travels straight, there is no load applied to the steering gear box 140 in left-to-right directions of the vehicle. Therefore, there is no change caused in a positional relationship between the inner and outer sleeves 151, 152 in left-to-right directions of the vehicle. As shown in FIG. 12, even if the wheel 10 moves vertically by bounding and rebounding, its toe hardly changes. In other words, the wheel 10 demonstrates a neutral steering tendency. FIG. 12 shows a relationship between bound stroke of the wheel 10 and its toe.

However, when the vehicle turns, there is generated a load (side force) applied to the steering gear box 140 in a left-to-right direction of the vehicle. For example, when the vehicle makes a left turn, the steering gear box 140 is pressed leftwards due to a side force F, which is applied leftwards thereto from the wheel 10 (knuckle 20) in FIG. 16. Referring now to FIG. 18, a right-side wall surface of the outer sleeve 152 approaches the inner sleeve 151. Thus, the plastic protrusion 159 of the outer sleeve 152 and a right-side section of the rubber portion 157b covering the plastic protrusion 159 approach the plastic protrusion 158 of the inner sleeve 151 and a right-side section of the rubber portion 157a covering the plastic protrusion 158. The clearance "a" between the rubber portions 157a, 157b decreases and eventually becomes zero. If the side force F from the wheel 10 (knuckle 20) further increases, the right-side wall surface of the outer sleeve 152 is urged further towards the inner sleeve 151, which is fixed to the vehicle body member 70. However, since the rubber portion 157a is rigid owing to the plastic protrusion 158 contained therein, the rubber portion 157b cannot move in left-to-right directions. Hence, the rubber portion 157b is urged to move along the gentle slope of the rubber portion 157a. Referring to FIG. 18, a leading end of the plastic protrusion 158 of the inner sleeve 151 is offset upwards from a leading end of the plastic protrusion 159 of the outer sleeve 152. Therefore, in this case, the outer sleeve 152 is displaced downwards relative to the inner sleeve 151.

When the vehicle makes a right turn, the outer sleeve 152 is also displaced downwards due to the same operation as in the case where the vehicle makes a left turn. This is because the flexible support devices 150 are symmetrically arranged in left-to-right directions of the vehicle.

Such a downward displacement of the outer sleeve 152 relative to the inner sleeve 151 results in a downward displacement of the steering gear box 140 relative to the vehicle body member 70. Therefore, the coupling point between the steering gear box 140 and the tie rod 130 moves downward. The tie rod 130 is coupled to the knuckle 20 via a ball joint, and the knuckle 20 is supported rotatably upon the king pin (not shown). Consequently, due to the downward displacement of the coupling point between the steering gear box 140 and the tie rod 130, the locus of movements of the knuckle 20 becomes different from that occurring during a straight-ahead travel of the vehicle. Accordingly, there is a change caused in the toe curve representing a relationship between bound stroke and toe when the wheel 10 bounds and rebounds.

The mechanism of the changing of the toe curve at the time of a downward displacement of the coupling point between the steering gear box 140 and the tie rod 130 will be described. FIG. 19 is a schematic rear view of the vehicle, illustrating a positional relationship between the tie rod 130 and the suspension mechanism during a straight-ahead travel of the vehicle. The strut 160 is expandable in the directions of its axis, as mentioned above. As the wheel 10 bounds and rebounds, the coupling point A between the strut 160 and the knuckle 20 moves following a locus in the direction of the axis of the strut 160. The lower arm 60 oscillates, as the wheel 10 bounds and rebounds, about the coupling point B between the lower arm 60 and the vehicle body member 70, so that the coupling point D between the lower arm 60 and the knuckle 20 moves up and down following an arc locus. The tie rod 130 moves as the wheel 10 bounds and rebounds, in such a manner that the coupling point N between the tie rod 130 and the knuckle 20 moves up and down about the coupling point C between the tie rod 130 and the steering gear box 140, following an arc locus (indicated by N1-N0-N2 in FIG. 20). Therefore, the knuckle 20 oscillates about a point 0 (an instantaneous center of the knuckle 20) at which an axis of the lower arm 60 viewed from the rear of the vehicle intersects a normal to the strut axis at the coupling point E between the strut 160 and the vehicle body member 70. The wheel 10 bounds and rebounds in such a manner as to follow the oscillation of the knuckle 20.

FIG. 20 illustrates a change of the locus of the coupling point N between the tie rod 130 and the knuckle 20 caused by a displacement of the coupling point C between the tie rod 130 and the steering gear box 140. When the coupling point C between the tie rod 130 and the steering gear box 140 is displaced from point C1 down to point C2, the locus of the coupling point N between the tie rod 130 and the knuckle 20 changes from an arc indicated by a broken line in FIG. 20 to an arc indicated by a solid line in FIG. 20, so that the position of the coupling point N between the knuckle 20 and the tie rod 130 for a maximum bound (point N2) shifts by an amount y in a direction of vehicle width from the maximum bound position of the coupling point N occurring before the coupling point C is displaced (that is, when the coupling point C is at point C1). Therefore, since the knuckle 20 is supported rotatably about an axis (axis of the king pin) connecting the coupling point D between the lower arm 60 and the knuckle 20 and the coupling point E between the strut 160 and the vehicle body member 70, the knuckle 20 turns by the amount y of locus shift. That is, when the coupling point C between the tie rod 130 and the steering gear box 140 is displaced downward (from C1 to C2), the toe curve changes from the curve occurring during a straight-ahead travel of the vehicle.

The toe curve becomes as shown in FIG. 13, when the coupling point C between the tie rod 130 and the steering gear box 140 is displaced downwards. When the vehicle makes a left turn, its left and right wheels are in rebounding and bounding states respectively. Therefore, it is apparent from FIG. 13 that the left wheel has a positive toe value corresponding to a toe-in state and that the right wheel has a negative toe value corresponding to a toe-out state. In other words, the vehicle demonstrates an understeer tendency when making a turn.

According to the above-described construction, the vehicle demonstrates a neutral steering tendency while travelling straight, and it demonstrates an understeer tendency by changing its toe curve when making a turn. In this manner, the vehicle achieves good steering stability.

It is true that the steering gear box mounting structure having such a construction makes it possible to obtain a neutral steering tendency while travelling straight and an understeer tendency when making a turn. However, in order to quickly accomplish the toe curve as shown in FIG. 13 in response to an increase in the side force F applied from the wheel 10 when the vehicle makes a turn, the clearance "a" needs to be set as small as possible so that the rubber portions 157a, 157b contact each other at an early stage. However, if the clearance "a" is set small, the vehicle obtains a curve a in FIG. 14, which represents a relationship between forces inputted to the vehicle in left-to-right directions and displacement of the steering gear box in left-to-right directions. Because the clearance "a" determines a linear range, the linear range becomes narrow if the clearance "a" is set small.

In the case where the linear range is narrow as indicated by the curve $\alpha$, although the steering gear box is first displaced in left-to-right directions in proportion to a force applied to the vehicle in left-to-right directions, the displacement stroke of the steering gear box does not increase linearly after the force exceeds a certain value. Hence, during an initial phase of turning, the understeer tendency obtained based on the side force F acting on the vehicle from the wheel 10 becomes non-linear, so that it becomes impossible to smoothly achieve good steering stability.

For this reason, it is desirable that the aforementioned linear range be set wide and that the toe curve representing toe changes caused by bounding and rebounding movements of the wheel be changed greatly as shown in FIG. 13 instead of being changed as shown in FIG. 12. However, such control is unable to be performed in the aforementioned construction.

SUMMARY OF THE INVENTION

In view of the aforementioned background, the present invention aims at providing a steering gear box mounting structure wherein the steering gear box is linearly displaced in left-to-right directions of the vehicle over a relatively wide range and wherein the toe curve of a wheel can be changed depending on whether the vehicle makes a turn or travels straight.

According to a first aspect of the present invention, there is provided a steering gear box mounting structure including a flexible support device for mounting a steering gear box to a vehicle body member and a flexible support device mounting portion for mounting the flexible support device to the steering gear box. The flexible support device may be formed integrally with the flexible support device mounting portion, and may comprise an outer sleeve fixed to the flexible support device mounting portion, an inner sleeve fixed to the vehicle body member, e.g., using a fastener, and an elastic body interposed between the inner and outer sleeves and including a hollow space. At least one of the outer sleeve and the inner sleeve has an inclined surface inclined with respect to a direction of an axis of the flexible support device. A portion filled with the elastic body is provided between the inclined surface and the other one of the outer sleeve and the inner sleeve. The outer sleeve is displaced in top-to-bottom directions relative to the inner sleeve in accordance with loads applied to the vehicle in left-to-right directions.

In the steering gear box mounting structure according to the first aspect of the present invention, when the vehicle makes, for example, a left turn, there is generated a side force applied to wheels of the vehicle leftwards. Thus, there is generated a load applied to the steering gear box leftwards. However, since at least one of the outer sleeve and the inner sleeve is provided with the inclined surface inclined with respect to a direction of an axis of the flexible support device, and the portion filled with the elastic body is provided between the inclined surface and the other one of the outer sleeve and the inner sleeve, the load acts on the inclined surface, thus displacing the outer sleeve downwards relative to the inner sleeve. Accordingly, owing to the geometry of the suspension system of the vehicle, the toe curve regarding each wheel changes, thereby achieving a desired steer tendency.

On the other hand, when the vehicle travels straight, there is no side force applied to the vehicle. Therefore, there is no change caused in a positional relationship in top-to-bottom directions between the inner and outer sleeves. Thus, as compared with the case where the vehicle makes a turn, the toe curve is less susceptible to bounding and rebounding movements of the wheels. In other words, the toe curve can be changed depending on whether the vehicle travels straight or makes a turn.

Furthermore, the elastic body, which includes the hollow space, is interposed between the inner and outer sleeves. Therefore, the range where the steering gear box is linearly displaced in proportion to a force applied thereto in left-to-right directions can be adjusted by suitably setting the dimension of the hollow space in left-to-right directions.

As described hitherto, the first aspect of the present invention makes it possible to obtain a steering gear box mounting structure wherein the steering gear box is linearly displaced in left-to-right directions of the vehicle over a relatively wide range and wherein the toe curve of a wheel can be changed depending on whether the vehicle makes a turn or travels straight.

In the aforementioned first aspect of the present invention, the flexible support device can be mounted to the steering gear box such that an axis of the flexible support device extends substantially parallel to the top-to-bottom directions.

In addition, in the aforementioned first aspect of the present invention, the hollow space can be asymmetrically formed with respect to a plane that includes an axial center of the flexible support device and is perpendicular to the axis of the flexible support device.

Furthermore, the portion of the outer sleeve contacting the elastic body without the hollow space interposed therebetween may be asymmetrically formed with respect to the plane that includes the axial center of the flexible support device and is perpendicular to the axis of the flexible support device. Still further, the inclined surface can be inclined with respect to the left-to-right directions of the vehicle such that the inclined surface is spaced apart from the axis of the flexible support device by a distance that becomes greater toward an axial end portion of the flexible support device.

In the first aspect of the present invention, the flexible support device may be cylindrically shaped in its axial center portion and may be conically shaped in its both axial end portions.

In addition to the effects obtained from the first aspect of the present invention, the thus-configured flexible support device provides further advantages. That is, the inclined surface that is inclined with respect to the direction perpendicular to the axis of the elastic body and the outer sleeve can be formed easily in both axial end portions of the flexible support device. The hollow space can also be formed easily in the cylindrically shaped axial center portion of the flexible support device.

Furthermore, in the first aspect of the present invention, each of the inner sleeve and the elastic body may be composed of two members of an identical shape, and the flexible support device may have a point-symmetrical configuration with respect to the axial center.

In addition to the effects obtained from the first aspect of the present invention, this construction provides further advantages. That is, each of the inner sleeve and the elastic body can be manufactured by placing its upper and lower constituents on each other, which brings about an enhancement of productivity and a reduction in costs.

Furthermore, in the first aspect of the present invention, the hollow space may be formed in the elastic body along a part of a circumference thereof, and the elastic body may include at least one radially extending auxiliary hollow space in an area where the hollow space does not exist.

In addition to the effects obtained from the first aspect of the present invention, this construction provides further advantages. That is, when the elastic body is displaced to deform the hollow space upon application of loads in left-to-right directions, the auxiliary hollow space facilitates deformation of the aforementioned hollow space.

Still further, in the steering gear box mounting structure according to the first aspect of the present invention, the inclined surface belonging to the inner sleeve may be an intermediate plate disposed in the elastic body.

In addition to the effects obtained from the first aspect of the present invention, this construction provides further advantages. That is, since the inclined surface belonging to the inner sleeve is an intermediate plate disposed in the elastic body, the elastic body can be interposed between the inclined surface of the outer sleeve and the intermediate plate substantially homogeneously in the axial direction of the flexible support device, so that the outer sleeve can be smoothly displaced in top-to-bottom directions. By providing a hollow space inwards of the intermediate plate or filling that hollow space with an elastic material, the flexible support device can be reduced in weight.

Still further, the steering gear box may be provided with a plurality of flexible support devices of the same configuration as the aforementioned flexible support device, and the flexible support devices may be arranged such that respective hollow spaces thereof become substantially symmetrical in left-to-right directions among the flexible support devices.

DETAILED DESCRIPTION OF PREFERRED EMBODIMENTS

Figure 1:
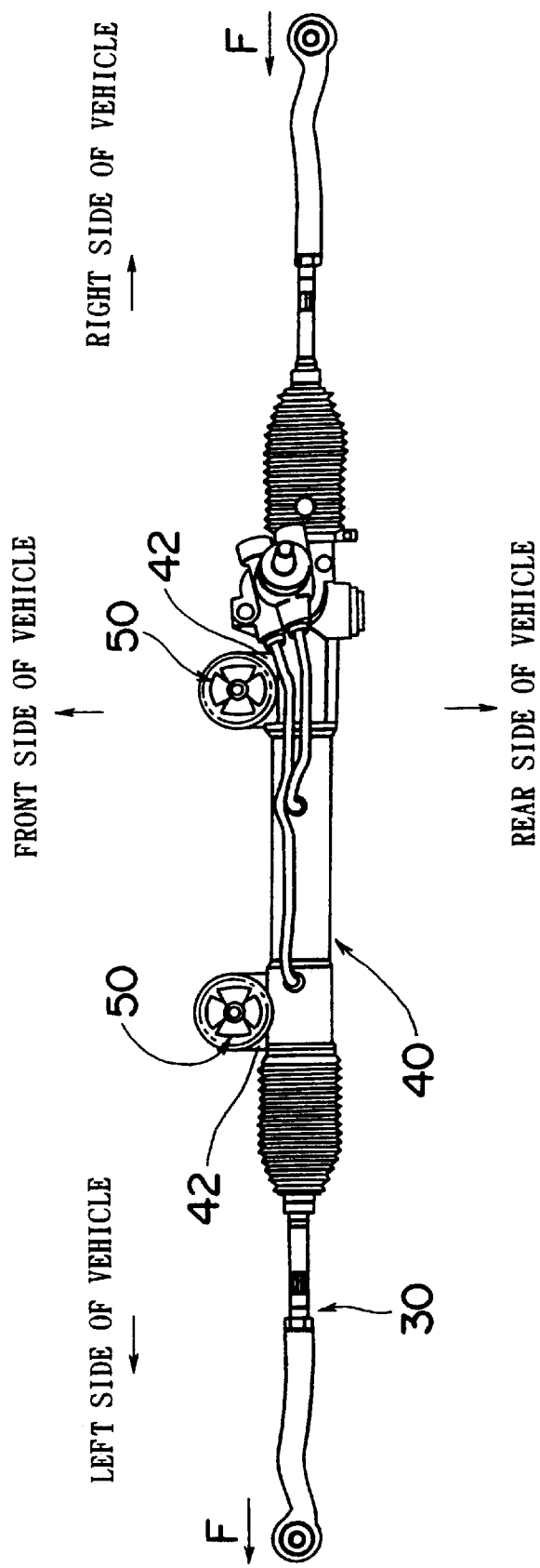
FIG. 1 is a plan view of a tie rod and a steering gear box equipped with flexible support devices according to a first embodiment of the present invention.
Figure 15:
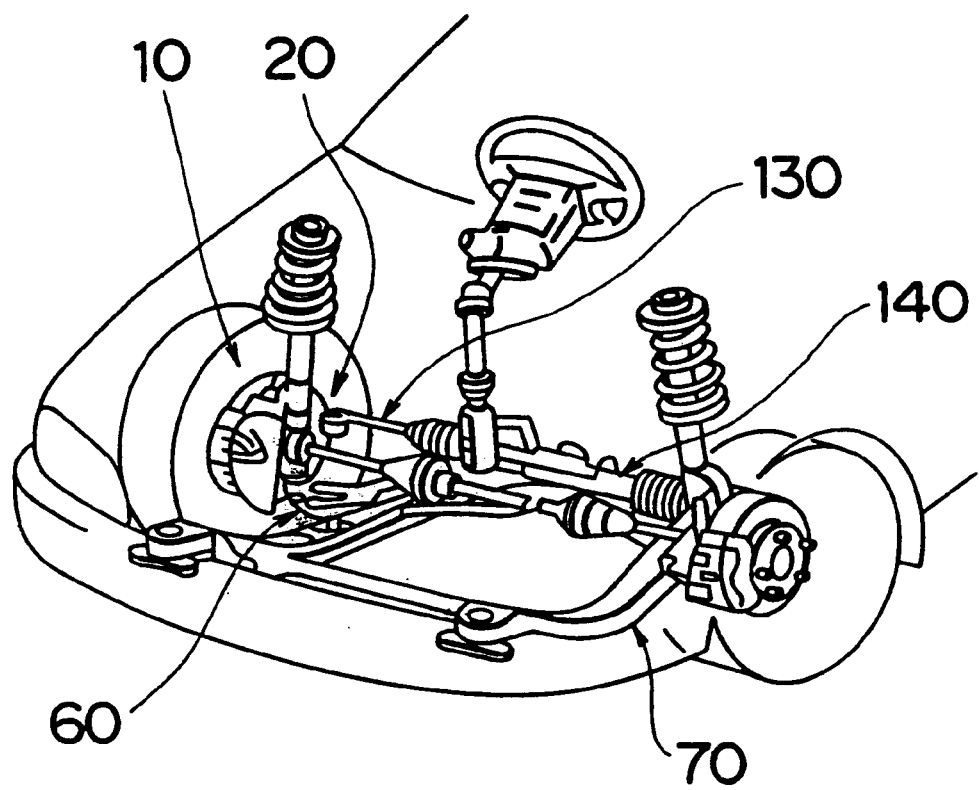
FIG. 15 is a perspective view of a vehicle front portion where a steering gear box is mounted to a vehicle body member.

FIG. 1 shows a tie rod 30 and a steering gear box 40 equipped with flexible support devices 50 in a steering gear box mounting structure according to a first embodiment of the present invention. As is the case with the tie rod 130 shown in FIG. 15, the tie rod 30 is coupled to the rear portion of the knuckle 20. This embodiment employs the wheel 10, the knuckle 20, the lower arm 60 and the vehicle body member 70, which have been described with reference to FIG. 15 and will not be explained hereinafter in further detail.

Figure 2:
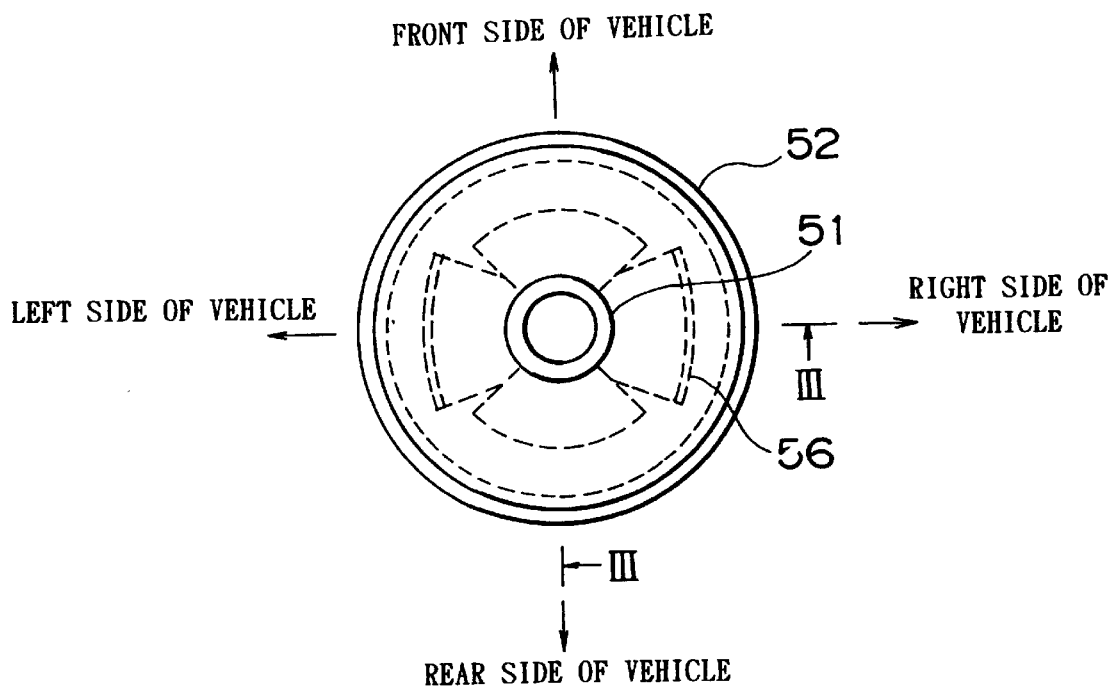
FIG. 2 is a top plan view of the flexible support device according to the first embodiment of the present invention.
Figure 3:
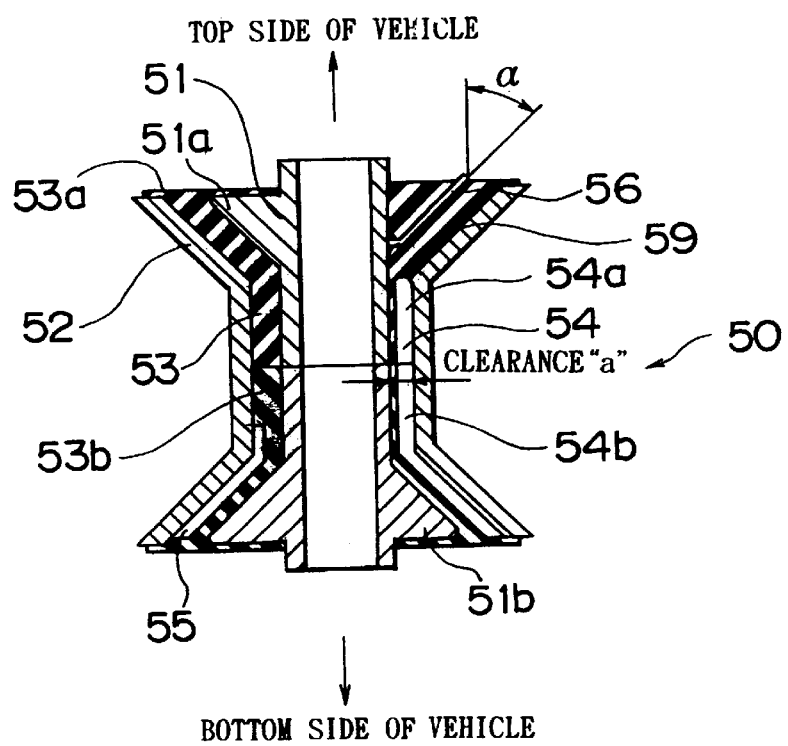
FIG. 3 is a sectional view taken along line III in FIG. 2.
Figure 4:
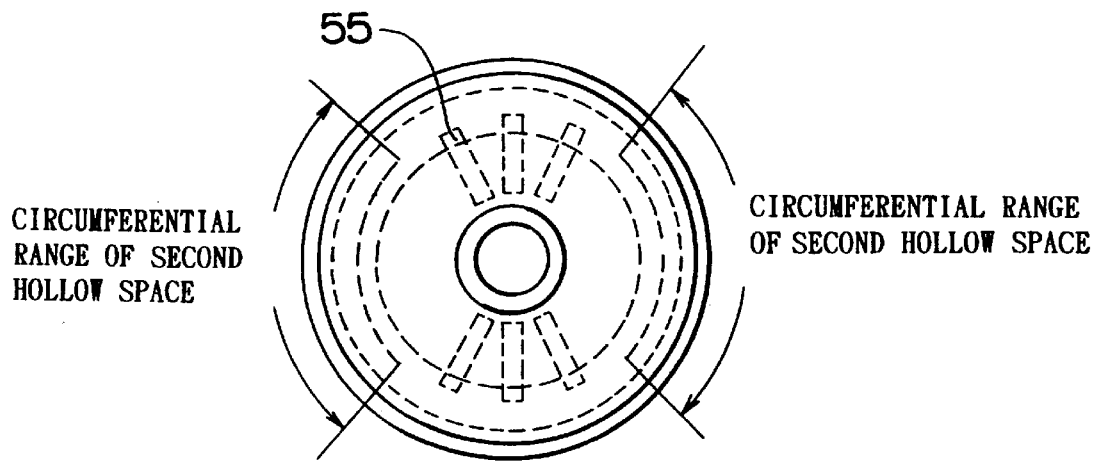
FIG. 4 is a bottom plan view of the flexible support device according to the first embodiment of the present invention.
Figure 16:
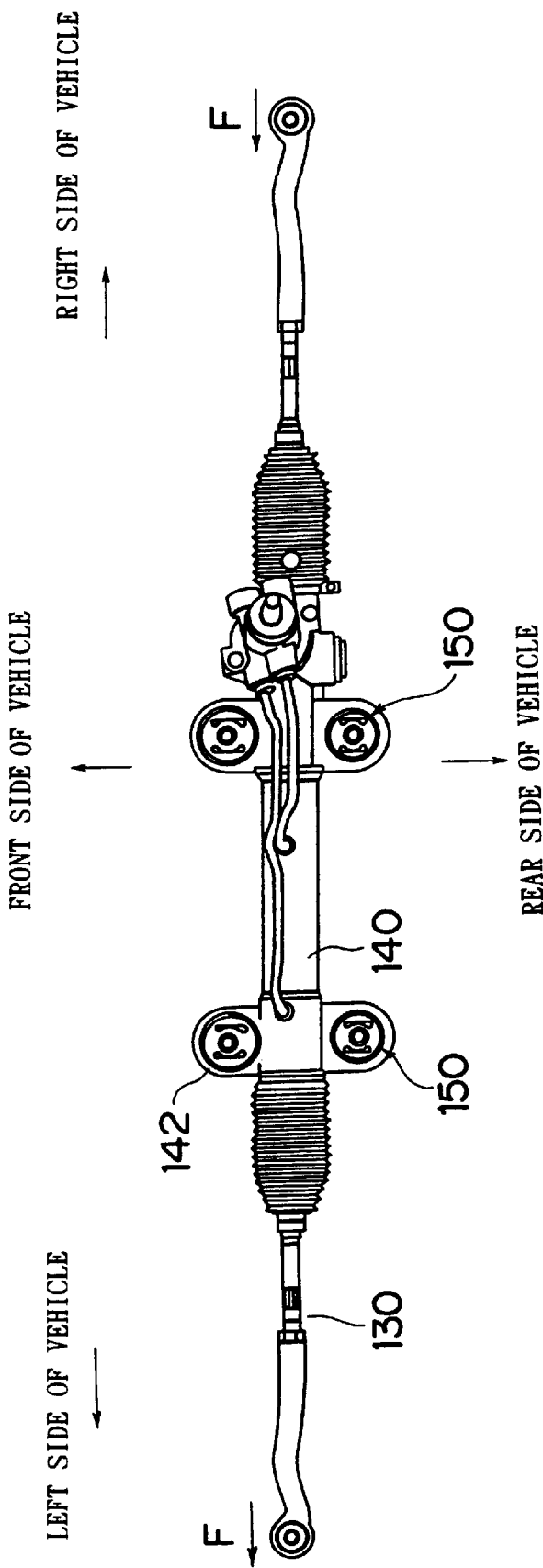
FIG. 16 is a plan view of a tie rod and the steering gear box equipped with flexible support devices.
Figure 17:
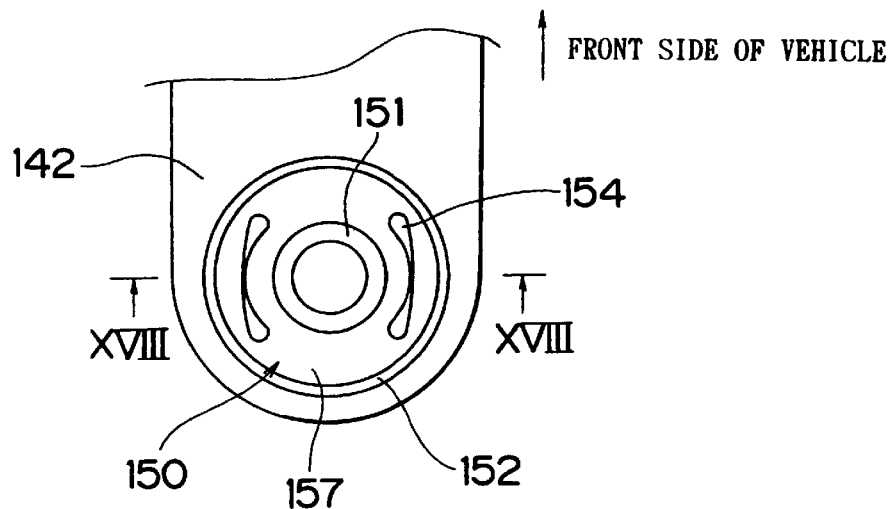
FIG. 17 is a plan view of the flexible support device mounted to a flexible support device mounting portion.
Figure 18:
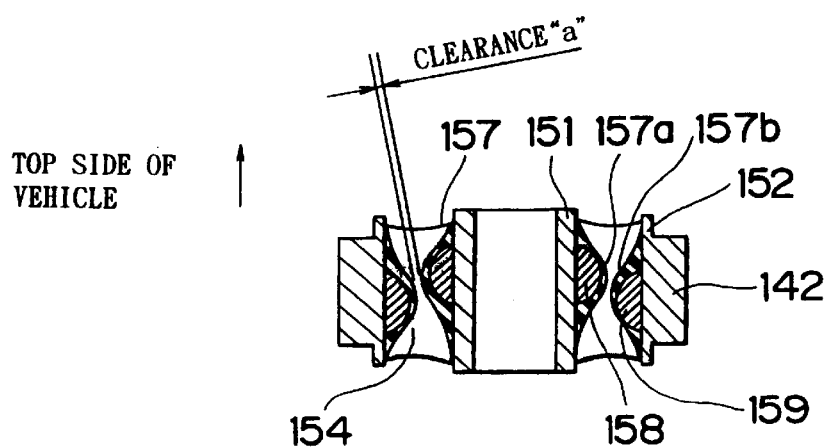
FIG. 18 is a sectional view taken along line XVIII—XVIII in FIG. 17.
Figure 19:
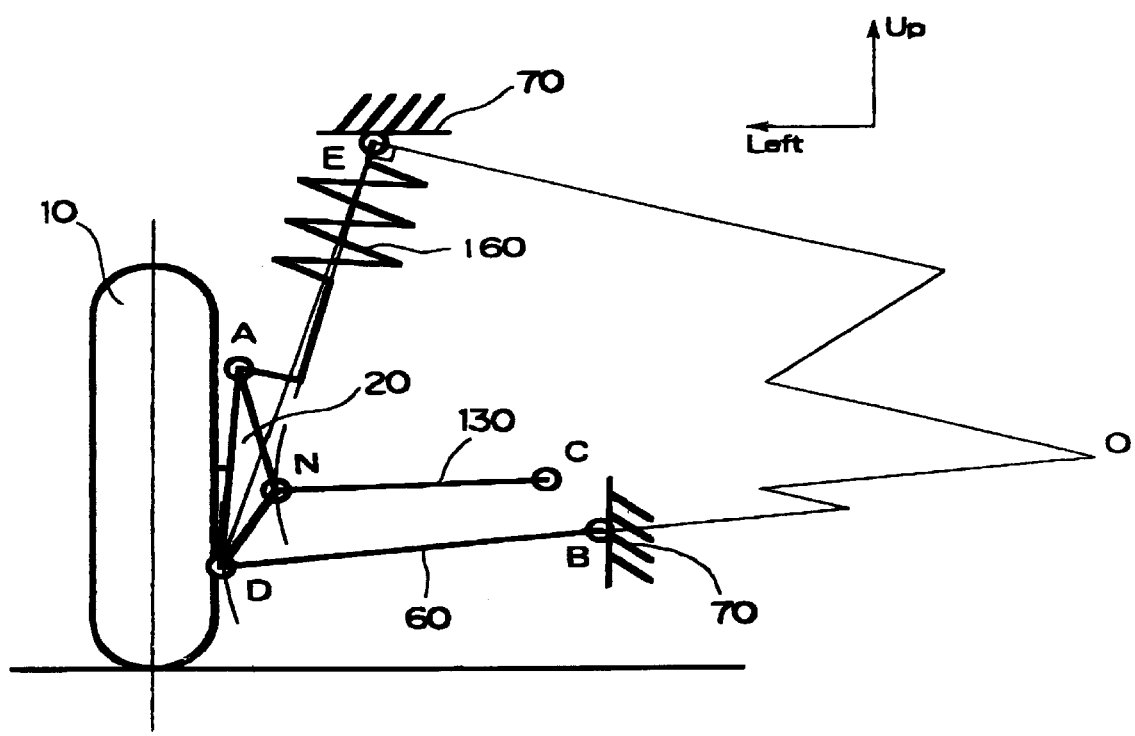
FIG. 19 is a schematic illustration viewed from the rear of a vehicle, indicating a positional relationship between a tie rod of the steering and a suspension mechanism during a straight-ahead travel of the vehicle.

FIG. 2 is a top plan view showing one of the flexible support devices 50. FIG. 3 is a sectional view taken along line III—III in FIG. 2. FIG. 4 is a bottom plan view of the flexible support device 50. As shown in FIG. 1, the steering gear box 40 has two flexible support device mounting portions 42, to which the flexible support devices 50 are mounted respectively so as to secure the steering gear box 40 to the vehicle body member 70. Referring to FIG. 16, the four flexible support device mounting portions 142 are equally distributed on the left and right sides of the steering gear box 140. Referring to FIG. 1, unlike the case with the steering gear box 140, the two flexible support device mounting portions 42 are equally distributed on the left and right sides of the steering gear box 40. However, there may be four flexible support device mounting portions 42 provided on the front side of the steering gear box 40 and equally distributed on the left and right sides thereof. Instead, the four flexible support device mounting portions 42 may be equally distributed on the front and rear sides of the steering gear box 40 as well as on the left and right sides thereof. If necessary, the number of flexible support device mounting portions to be provided may be altered.

As can be seen from FIGS. 2, 3 and 4, the inner sleeve 51 is composed of a first inner sleeve 51a and a second inner sleeve 51b. The first inner sleeve 51a is disposed on the second inner sleeve 51b. The inner sleeve 51 has therein a cylindrical hollow space, through which a bolt (not shown) is passed to be screwed into the vehicle body member 70. The first inner sleeve 51a has a conical shape opening axially upwards, over a circumferential range of about 60° on each of the front and rear sides of the vehicle. It is not indispensable that the conical shape extend Over the circumferential range of about 60°. This conical shape is only required to cover any suitable circumferential range on each of the front and rear sides of the vehicle. In addition, there is provided a cup-like intermediate plate 56 extending over a circumferential range of about 60° on each of the left and right sides of the vehicle. The intermediate plate 56 opens upwards in the axial direction of the flexible support device 50 at an opening angle α. It is again to be noted that the intermediate plate 56 is required to cover any suitable circumferential range on each of the left and right sides of the vehicle. According to a variation of this embodiment, instead of using the intermediate plate 56, it is possible to arrange another piece of the aforementioned conical first inner sleeve 51a in such a manner as to cover a certain circumferential range on the left and right sides of the vehicle. Because such variation is functionally identical to the original embodiment, the following description will deal with the intermediate plate 56. The intermediate plate 56 has a cup-like bottom portion welded to the cylindrical first inner sleeve 51a. The outer sleeve 52 has in its axially upper portion a conical surface extending in correspondence with the intermediate plate 56. The outer sleeve 52 has an inner surface 59 that is inclined.

On the other hand, the second inner sleeve 51b is shaped in its axially lower portion like a cone opening downwards. The outer sleeve 52 is shaped in its axially lower portion like a cone corresponding to the second inner sleeve 51b. Even if the second inner sleeve 51b and the outer sleeve 52 are shaped in their axially lower portions like a cylinder instead of a cone, they have no trouble performing properly. In this embodiment, the inner and outer sleeves 51, 52 each have a body comprising conical portions and a cylindrical portion. However, the inner and outer sleeves 51, 52 are not limited to such configuration and may have a polygonal or elliptic cross-section.

The inner and outer sleeves 51, 52 and the intermediate plate 56 define a space including a hollow space 54. The remnant space is occupied by an elastic body 53, which is composed of a first elastic body 53a and a second elastic body 53b. The first and second elastic bodies 53a, 53b correspond to upper and lower half portions of the flexible support device 50, respectively. In the upper half portion of the flexible support device 50, the outer sleeve 52 has around its axial center a cylindrical portion, in which a first hollow space 54a extends over a circumferential range of about 90° on each of the left and right sides of the vehicle. Although the first hollow space 54a is in contact with the outer sleeve 52 in FIG. 3, it may be in contact with the first inner sleeve 51a instead. It is not indispensable either that the first hollow space 54a extend over the circumferential range of about 90°. On the other hand, in the lower half portion of the flexible support device 50, there is formed a second hollow space 54b between the inner and outer sleeves 51, 52. The second hollow space 54b extends over a circumferential range of about 90° on each of the left and right sides of the vehicle, as can be seen from FIG. 4. It is not indispensable either that the second hollow space 54b extend over the circumferential range of about 90°. Although the second hollow space 54b is in contact with the outer sleeve 52 in FIG. 3, it may be in contact with the second inner sleeve 51b instead.

As shown in FIG. 4, three auxiliary hollow spaces 55 radially extend over a circumferential range of about 90° on each of the front and rear sides of the vehicle. It is not indispensable that the auxiliary hollow spaces 55 extend over the circumferential range of about 90°, and the number of the auxiliary hollow spaces to be formed is not limited to three, but can be less or more.

Figure 5:
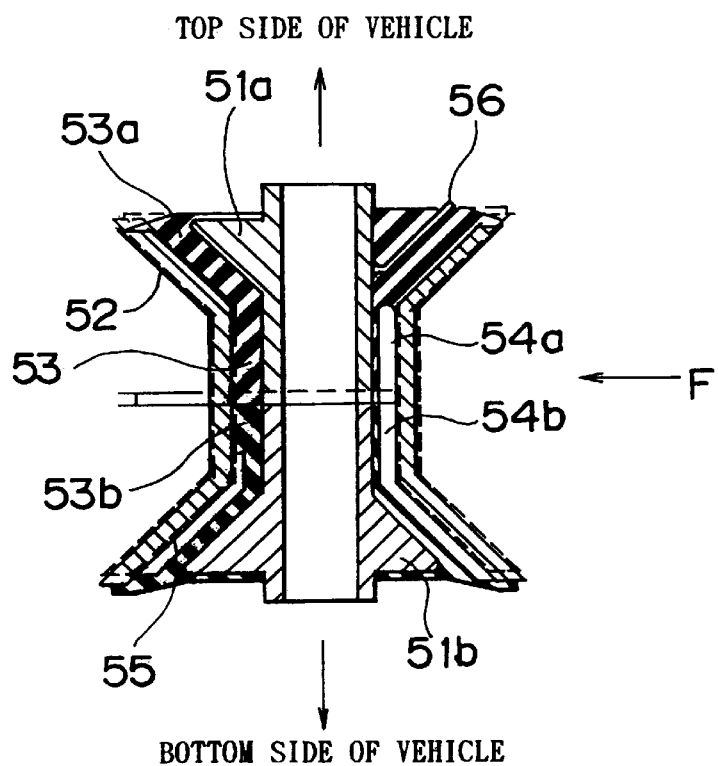
FIG. 5 is a sectional view taken along line III in FIG. 2, showing how the flexible support device according to the first embodiment of the present invention is displaced when a load is applied thereto leftwards.

The operation of the steering gear box mounting structure according to the aforementioned first embodiment of the present invention will now be described. The following description will be made based on the flexible support device 50 that supports the steering gear box 40 on the right side of the vehicle. For example, if the vehicle equipped with the flexible support device 50 turns left, the wheel receives a side force acting thereon leftwards. Thus, the steering gear box 40 mounted to the vehicle receives a load F corresponding to the side force acting leftwards, via the knuckle 20 and the tie rod 30. The outer sleeve 52 and the elastic body 53 are in contact with each other along the inclined surface 59 formed in the axially upper portion of the flexible support device 50. In other words, there is no hollow space formed between the outer sleeve 52 and the elastic body 53. Therefore, the load F is applied to an intermediate plate 56, via the inclined surface 59. The intermediate plate 56 has such a shape as to convert a leftward input load into a downward force. On the right side of the vehicle, the inclined surface 59 is designed to direct downwards a load that acts thereon leftwards. On the other hand, in the lower half of the flexible support device 50, the second hollow space 54b is formed between the conical portion of the outer sleeve 52 and the second elastic body 53b, over a circumferential range of about 90° on each of the left and right sides of the vehicle. Accordingly, the elastic body 53 is deformed from a state indicated by a dotted line in FIG. 5 into a state indicated by a solid line in FIG. 5. As indicated by the solid line, the outer sleeve 52 is displaced downwards relative to the inner sleeve 51. As described above, the three radially extending auxiliary hollow spaces 55 are formed inside the elastic body 53 over the circumferential range of about 90° on each of the front and rear sides of the vehicle. The auxiliary hollow spaces 55 facilitate downward displacement of the outer sleeve 52.

Figure 12:
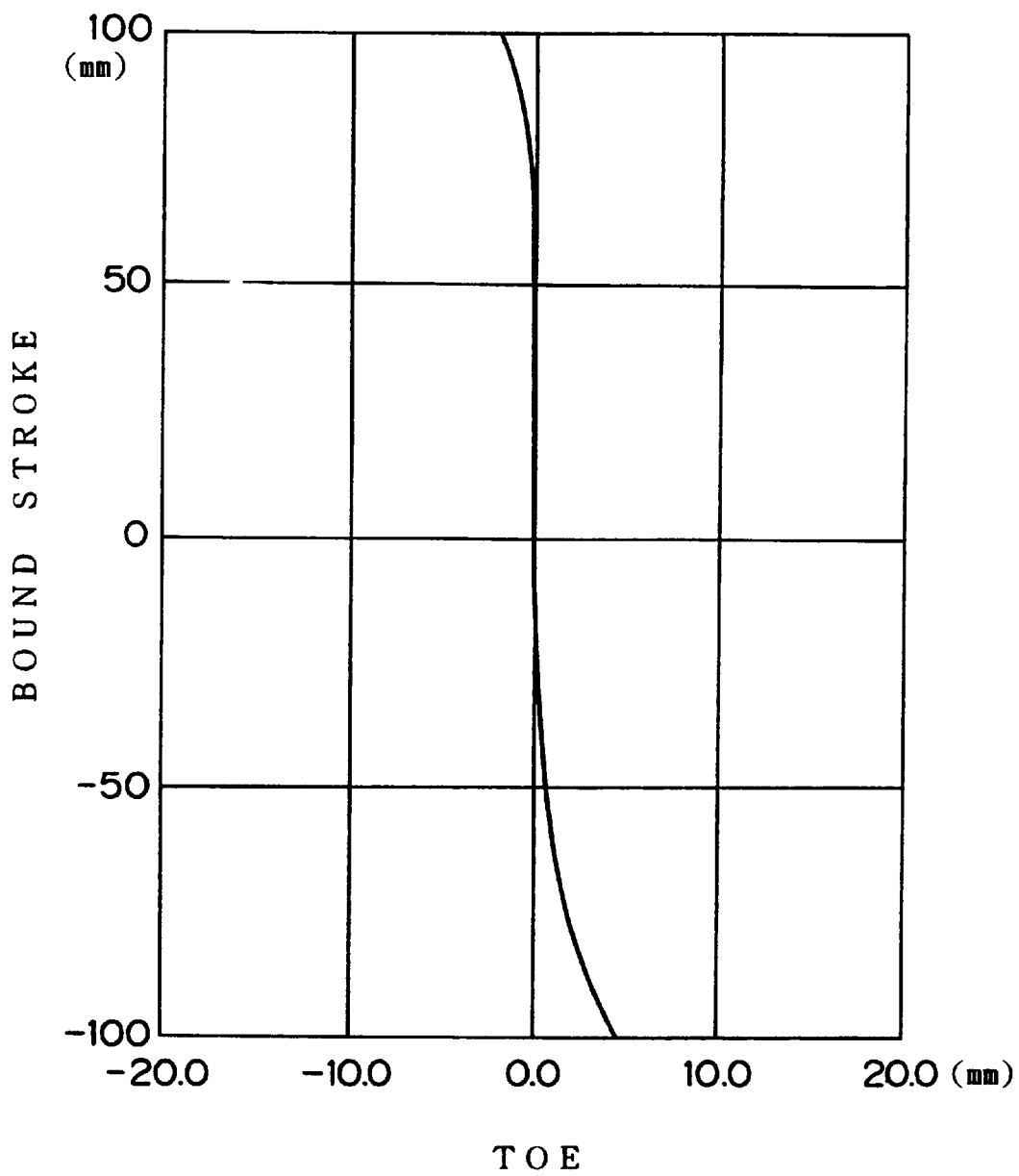
FIG. 12 shows a toe curve representing a relationship between bound stroke and toe when the vehicle travels straight.
Figure 13:
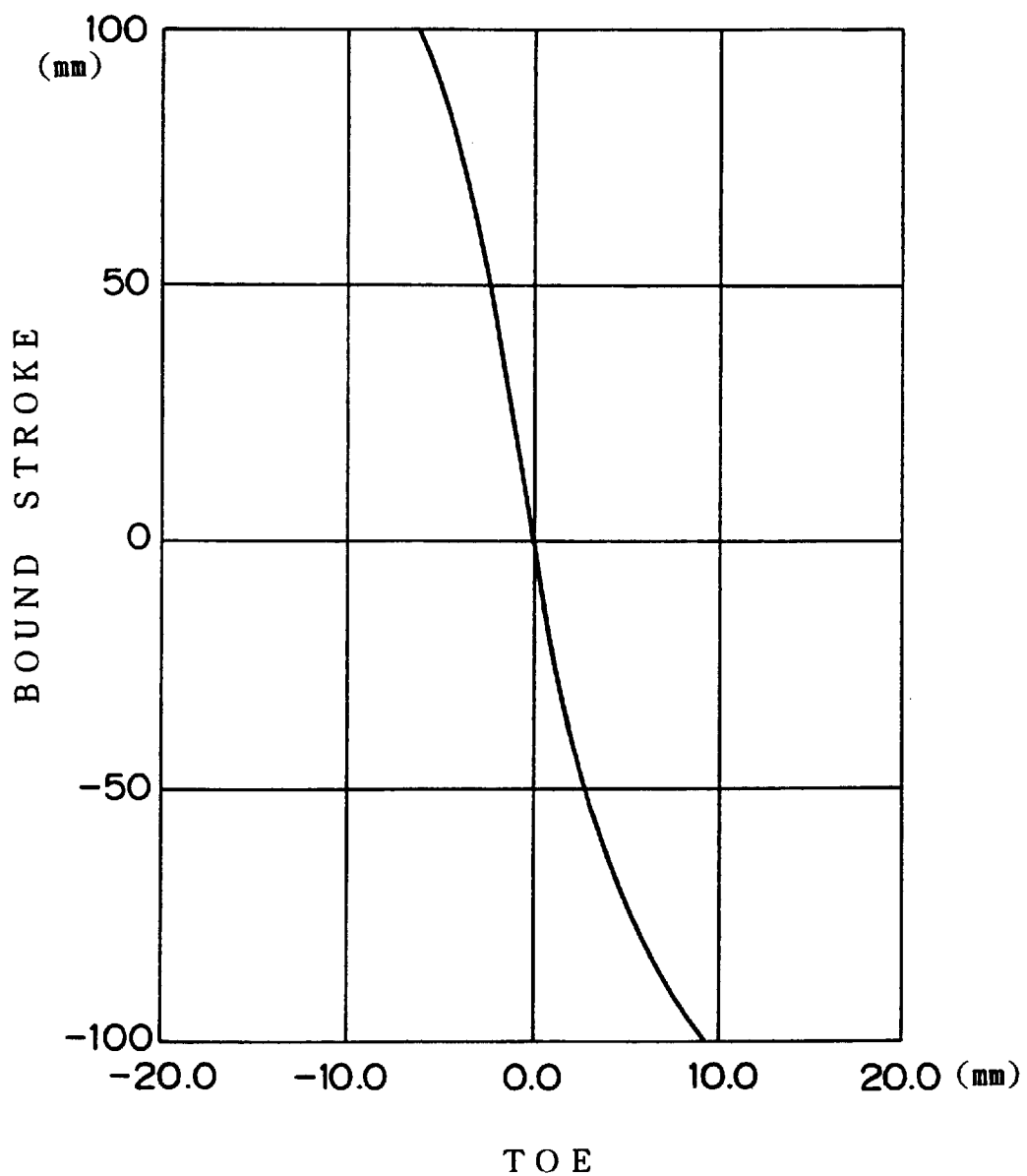
FIG. 13 shows a toe curve representing a relationship between bound stroke and toe when the vehicle makes a turn.

If the outer sleeve 52 is displaced downwards, the steering gear box 40 is displaced downwards by about 2 to 3 mm relative to the vehicle body member 70. Hence, the coupling position where the tie rod 30 and the steering gear box 40 are coupled to each other is displaced downwards. As is the case with FIG. 15, since the tie rod 30 is coupled to the knuckle 20 via a ball joint (not shown), the positional relationship between the steering gear box 40 and the knuckle 20 changes vertically. Thus, the knuckle 20 follows a locus determined by the bounding and rebounding movements of the wheel 10, which locus is different from a locus followed by the knuckle 20 when it is in an initial state (e.g. when the vehicle travels straight). That is, there is a change caused in the toe curve representing a relationship between bound stroke and toe when the wheel 10 bounds and rebounds. As a result, the toe curve shown in FIG. 13 is obtained instead of the toe curve shown in FIG. 12, which is obtained when the vehicle travels straight. As shown in FIG. 13, when the vehicle makes a left turn, the left and right front wheels rebound and bound respectively. In other words, the left and right front wheels come to have toe-in and toe-out tendencies respectively. Consequently, the vehicle demonstrates an understeer tendency.

When the vehicle travels straight, there is no side force acting thereon. That is, there is no load applied to the vehicle in left-to-right directions. Therefore, the outer sleeve 52 is not vertically displaced relative to the inner sleeve 51. Hence, as shown in FIG. 12, the toe curve obtained in this state is hardly affected by bounding and rebounding movements of the wheels. In this manner, the toe curve can be changed depending on whether the vehicle travels straight or makes a turn.

Figure 14:
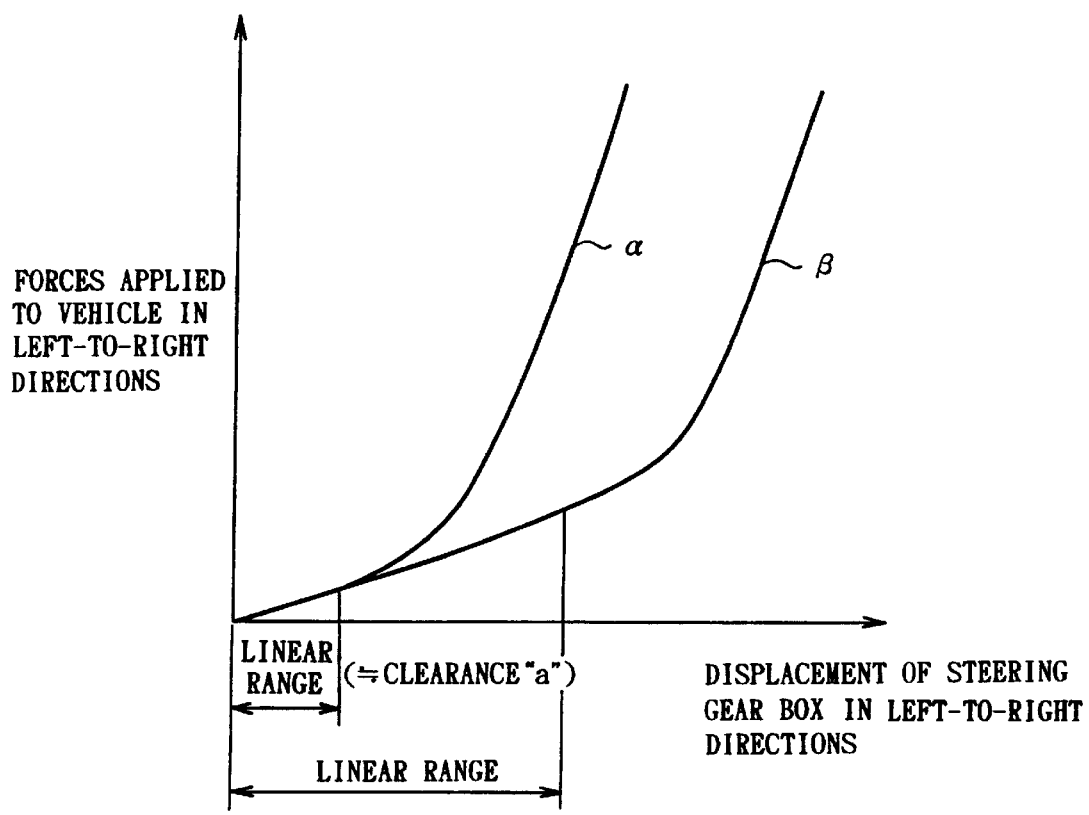
FIG. 14 is a graph representing a relationship between forces applied to the vehicle in left-to-right directions and displacement of the steering gear box in left-to-right directions.

As described above, FIG. 14 represents a relationship between forces inputted to the vehicle in left-to-right directions and displacement of the steering gear box in left-to-right directions. In the first embodiment of the present invention, since the first and second hollow spaces 54a, 54b are formed between the inner and outer sleeves 51, 52, the steering gear box 40 can be displaced substantially linearly in left-to-right directions during an initial phase of turning. If the clearance "a" shown in FIG. 3 is set to a predetermined suitable value, there is no possibility of the steering gear box 40 immediately reducing its displacement stroke in left-to-right directions in response to forces acting thereon in left-to-right directions. In other words, the linear range of compliance does not become too narrow as indicated by the aforementioned curve α. That is, this linear range of compliance can be adjusted in accordance with the clearance "a", the hardness of the elastic body 53 and the degree of compression of the elastic body 53 (the pre-load applied thereto) when interposed between the inner and outer sleeves 51, 52. Accordingly, it is possible to obtain a characteristic curve β shown in FIG. 14.

Although the foregoing description has been limited to the case where the vehicle makes a left turn, it is apparent that the flexible support devices 50 according to the first embodiment of the present invention operate exactly in the same manner when the vehicle makes a right turn. This is because the flexible support devices 50 are symmetrically arranged on the left and right sides of the vehicle. Further, due to the geometry of the vehicular suspension system, the steering gear box of this embodiment is designed such that the outer sleeve is displaced downwards relative to the inner sleeve so as to obtain the toe curve shown in FIG. 13. However, in the case where another suspension system of a different type is employed, the steering gear box may also be designed such that the outer sleeve is displaced upwards relative to the inner sleeve so as to obtain the toe curve shown in FIG. 13. This is achieved, for example, by turning the flexible support devices 50 shown in FIGS. 2 through 4 upside down.

Figure 6:
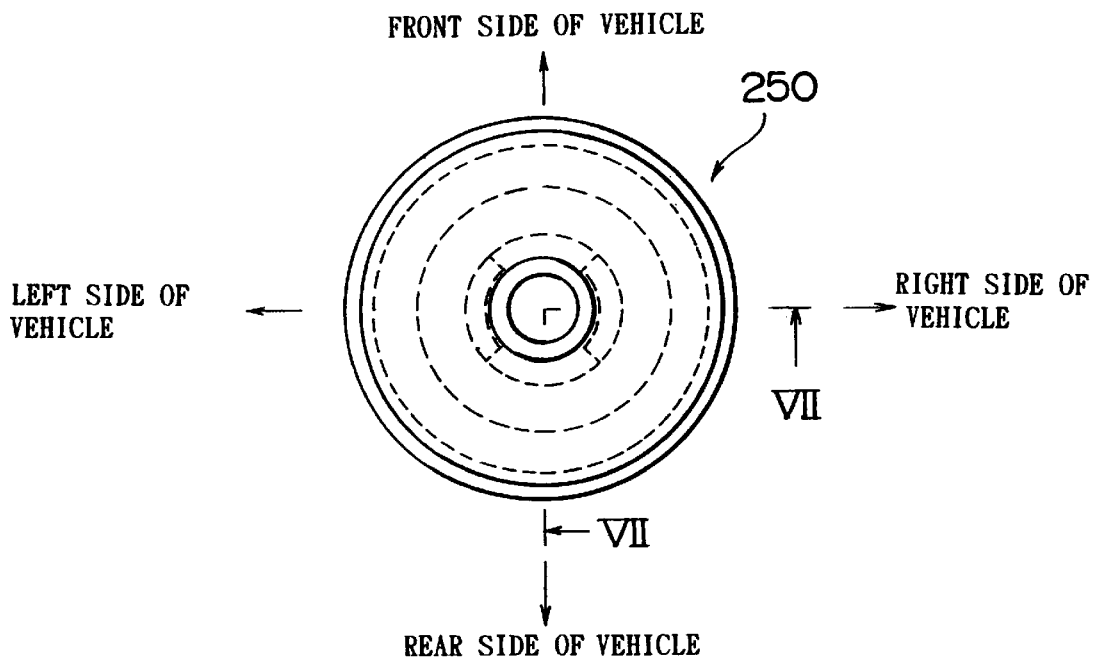
FIG. 6 is a top plan view of a flexible support device according to a second embodiment of the present invention.
Figure 7:
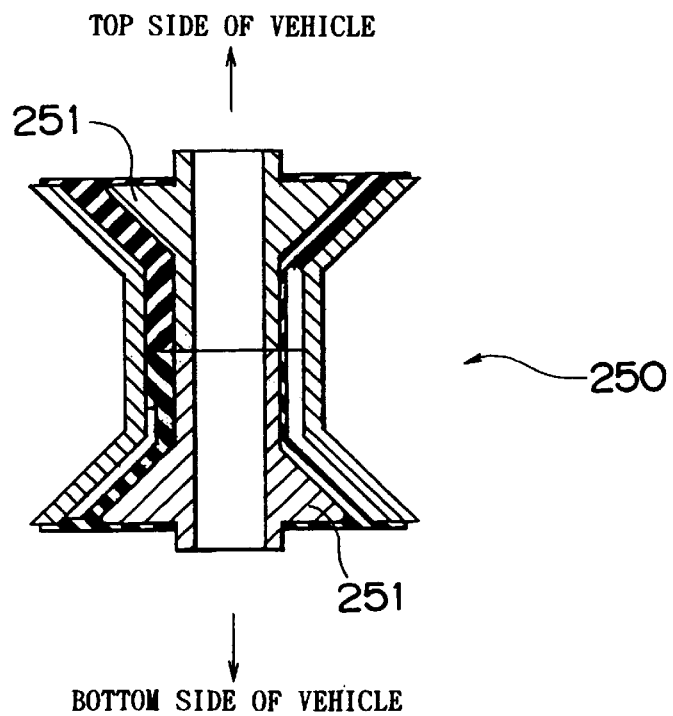
FIG. 7 is a sectional view taken along line VII—VII in FIG. 6.
Figure 8:
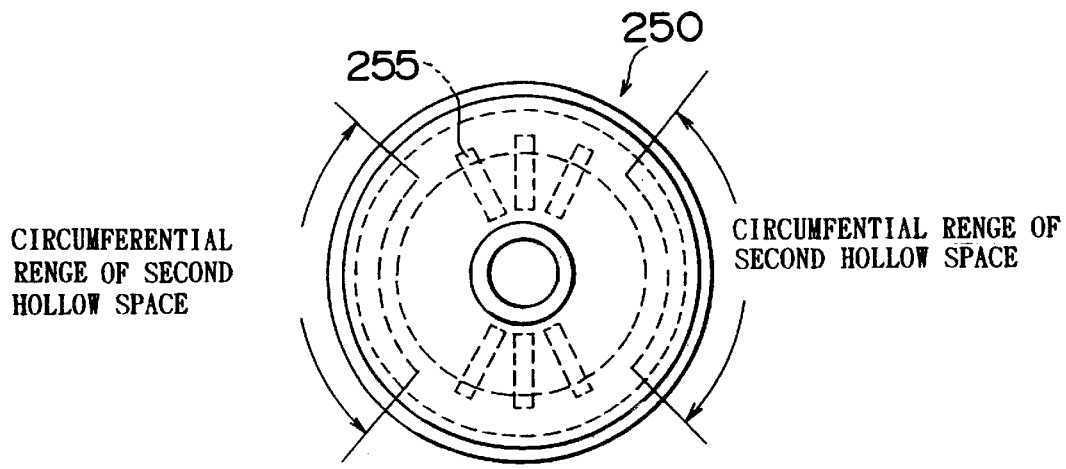
FIG. 8 is a bottom plan view of the flexible support device according to the second embodiment of the present invention.

A steering gear box mounting structure according to a second embodiment of the present invention will now be described. The steering gear box mounting structure of the second embodiment includes flexible support devices 250. FIG. 6 is a top plan view of one of the flexible support devices 250. FIG. 7 is a sectional view taken along line VII—VII in FIG. 6. FIG. 8 is a bottom plan view of the flexible support device 250. The second embodiment dispenses with the intermediate plate 56 and is different from the first embodiment in that the flexible support device 250 has an inner sleeve 251 that is conically shaped at its both axial end portions along the entire circumference thereof. The inner sleeve 251 eliminates the necessity to weld the intermediate plate 56 thereto. In addition, since the inner sleeve 251 has a simple conical shape along the entire circumference thereof, it can be processed easily. Because the second embodiment is identical to the first embodiment in other respects, the description thereof will be omitted.

Figure 9:
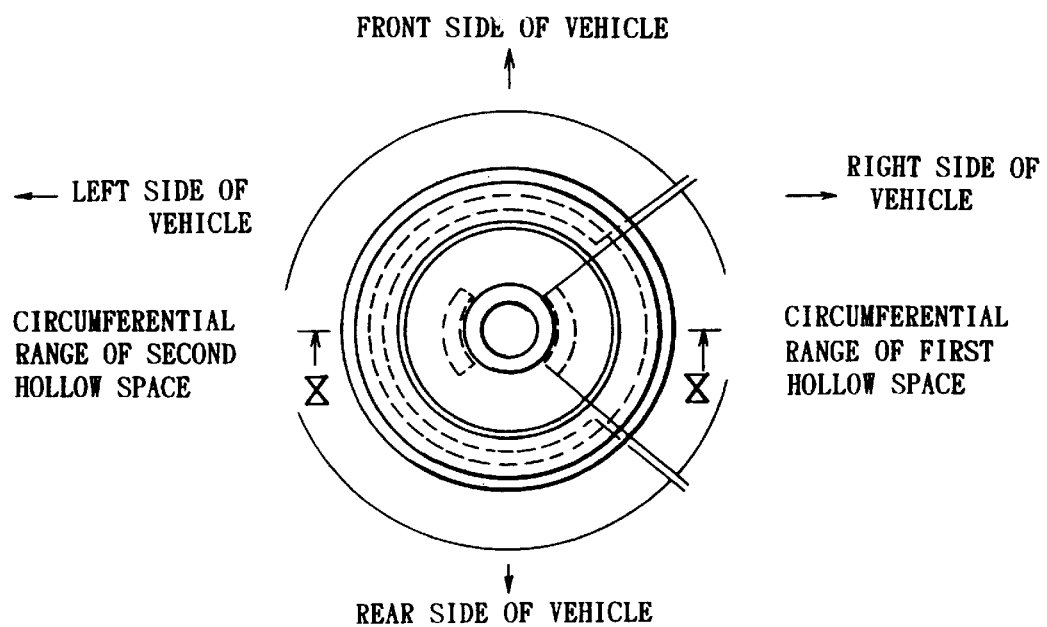
FIG. 9 is a top plan view of a flexible support device according to a third embodiment of the present invention.
Figure 10:
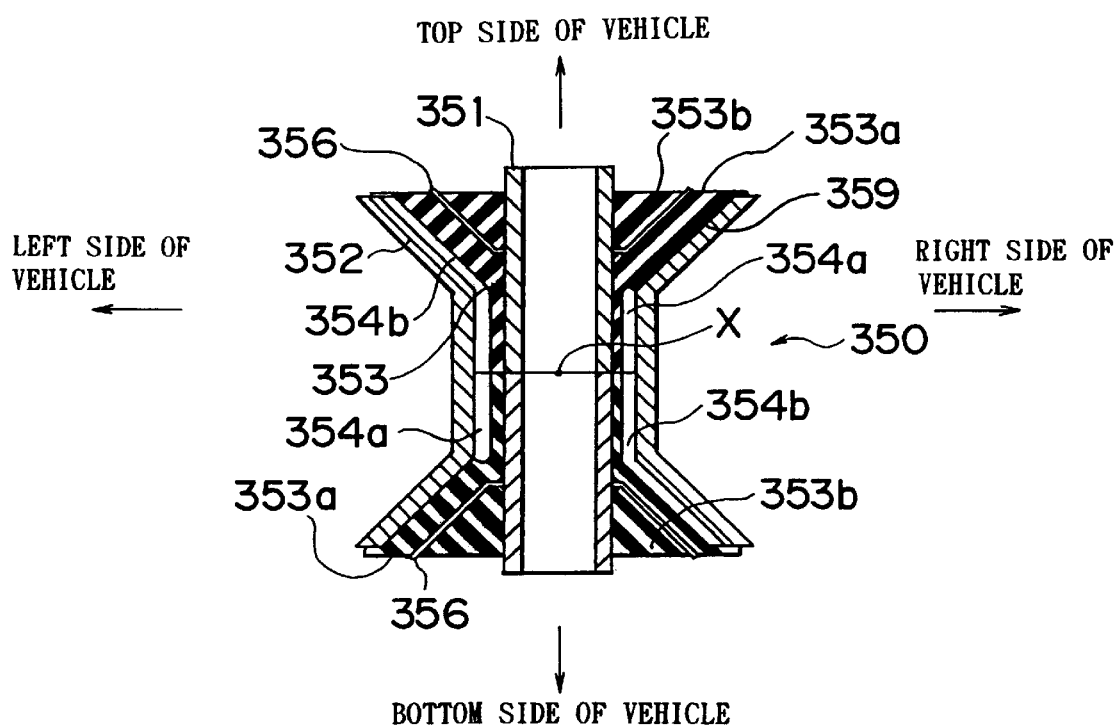
FIG. 10 is a sectional view taken along line X—X in FIG. 9.
Figure 11:
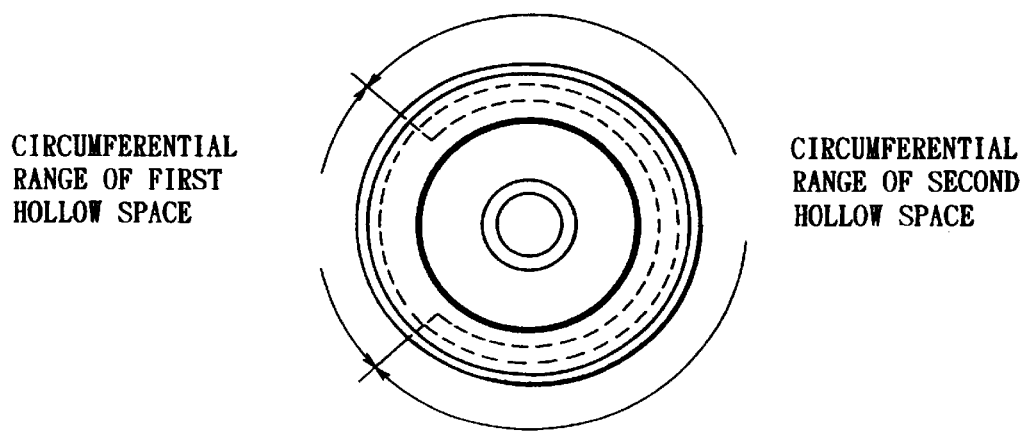
FIG. 11 is a bottom plan view of the flexible support device according to the third embodiment of the present invention.

A steering gear box mounting structure according to a third embodiment of the present invention will now be described. The steering gear box mounting structure of the third embodiment includes flexible support devices 350 each composed of inner sleeves 351, outer sleeves 352, elastic bodies 353 and intermediate plates 356. FIG. 9 is a top plan view of one of the flexible support devices 350. FIG. 10 is a sectional view taken along line X—X in FIG. 9. FIG. 11 is a bottom plan view of the flexible support device 350. The flexible support device 350 of the third embodiment has a point-symmetrical configuration with respect to its axial center X. The outer sleeve 352 is also symmetrical with respect to a plane stretching perpendicularly to the axis and including the axial center X. Each of the inner sleeve 351 and the elastic body 353 is equally divided into two halves by the plane stretching perpendicularly to the axis and including the axial center X. The inner sleeve 351 has a simple cylindrical shape. The intermediate plate 356 is shaped along the entire circumference thereof like a cup opening towards each axial end portion of the flexible support device 350. The intermediate plate 356 is welded at its bottom of the cup-shaped portion to the inner sleeve 351. The third embodiment is different from the first embodiment in that the inner sleeves 351, the elastic bodies 353 and the intermediate plates 356 are each provided in pairs of the same configuration and are placed on each other so as to construct the flexible support device 350. Therefore, the third embodiment brings about an enhancement of productivity and a reduction in costs.

The outer sleeve 352 has in its cylindrical portion a first hollow space 354a, which extends over a circumferential range of about 90° on each of the left and right sides of the vehicle. As shown in FIGS. 10 and 11, the outer sleeve 352 has in its conical portion a second hollow space 354b, which extends over a circumferential range of about 270°. It is not indispensable that the first and second hollow spaces 354a, 354b extend over the circumferential ranges of about 90° and 270°, respectively. Although the first and second hollow spaces 354a, 354b are in contact with the outer sleeve 352 in FIG. 10, they may be in contact with the inner sleeve 351 instead.

The operation of the steering gear box mounting structure according to the third embodiment of the present invention will now be described. For example, when the vehicle makes a left turn, there is generated a load F applied to the outer sleeve 352 leftwards as a result of a side force acting thereon. The load F is directed downwards by an inclined surface 359 of the outer sleeve 352, so that the outer sleeve 352 deforms the first elastic body 353a downwards. In the lower half of the flexible support device 350, the second hollow space 354b extends over the circumferential range of about 270°, which facilitates downward displacement of the outer sleeve 352. Consequently, the outer sleeve 352 is smoothly displaced downwards relative to the inner sleeve 351. Hence, as is the case with the first embodiment, the toe curve as shown in FIG. 13 can be obtained.

In the third embodiment of the present invention, as described above, the flexible support device 350 has a point-symmetrical configuration with respect to its axial center X. One of the flexible support devices 350 is mounted to the right-side one of the two flexible support device mounting portions 42 of the steering gear box 40 as shown in FIG. 10. However, the other flexible support device 350 is differently mounted to the left-side one of the flexible support device mounting portions 42. That is, this flexible support device 350 is arranged in an inverse relation to the flexible support device 350 shown in FIG. 10 with respect to left-to-right directions. Thus, the steering gear box mounting structure of the third embodiment operates differently from that of the first embodiment. The left-side flexible support device 350 is different from the right-side flexible support device 350 in that the second hollow space 354b is formed between an upper inclined surface of the outer sleeve 352 and the elastic body 353 and that the elastic body 353 is in contact with a lower inclined surface of the outer sleeve 352. Hence, if the outer sleeve 352 receives a load applied thereto leftwards, it is displaced upwards relative to the inner sleeve 351.

Accordingly, when the vehicle makes a left turn, the outer sleeve 352 is displaced downwards relative to the inner sleeve 351 in the right-side flexible support device 350, and the outer sleeve 352 is displaced upwards relative to the inner sleeve 351 in the left-side flexible support device 350. Based on the geometry of the vehicular suspension system, while the right front wheel obtains the toe curve as shown in FIG. 13, the left front wheel obtains a toe curve that has an inverse relation to the toe curve of the right front wheel. Therefore, when the vehicle makes a left turn, both the right and left front wheels assume a toe-out state. In other words, the right and left front wheels demonstrate understeer and oversteer tendencies respectively, thereby accomplishing neutral steering characteristics. In reality, however, when the vehicle makes a left turn, the right front wheel is located radially outwardly of the left front wheel. For this reason, the cornering force applied to the right front wheel is larger than that applied to the left front wheel, so that the toe-out state (the understeer tendency) of the right front wheel has a greater influence. As a result, the vehicle demonstrates an understeer tendency as a whole, thus achieving the object of the present invention.

The foregoing description has been made in conjunction with the flexible support devices having a construction wherein an inclined surface is formed on which the outer sleeve and the elastic body contact each other, and wherein another inclined surface is formed by the conical configuration of the inner sleeve or the intermediate plate. However, substantially the same advantages can be achieved without the conical configuration of the inner sleeve or the intermediate plate, if an inclined surface is formed on which the outer sleeve and the elastic body contact each other. That is, the inner sleeve may have a simple cylindrical shape. For example, if a leftward force F acts on a flexible support device provided on the left side of a vehicle, the inclined surface receives a leftward force via the outer sleeve. In this process, the leftward force from the outer sleeve is converted by the inclined surface of the elastic body into a downward force, which acts on the outer sleeve. As a result, the outer sleeve is displaced downward relative to the inner sleeve. In addition, the outer sleeve is displaced toward the inclined surface by the inner sleeve or the intermediate plate and the elastic body.

Although in the foregoing embodiments, a desired understeer tendency during a turn is achieved by a downward displacement of the coupling point between the steering gear box and the tie rod, a desired steer tendency during a turn can also be achieved by an upward displacement of the coupling point between the steering gear box and the tie rod, depending on vehicles.

Figure 20:
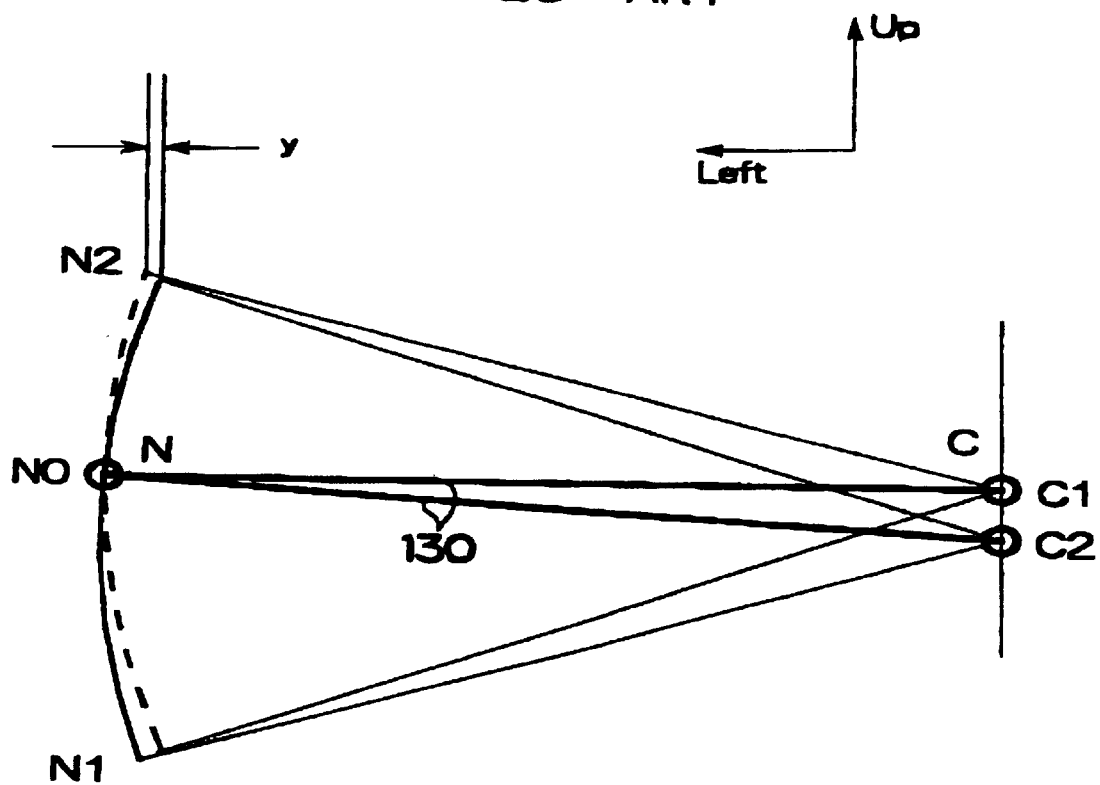
FIG. 20 illustrates a change of the locus of a coupling point between the tie rod and a knuckle caused by a displacement of a coupling point between the tie rod and a steering gear box.

This will be explained in detail. According to the invention, it is an object to achieve a desired steer tendency during a turn by causing the toe curve during a turn to change from the toe curve during a straight-ahead travel of the vehicle. For example, if the understeer tendency of a vehicle during a turn is stronger than a desired level, a reverse of the locus change described above is needed. More specifically, if the coupling point C between the steering gear box and the tie rod during a straight-ahead travel of the vehicle is at point C2 in FIG. 20, the locus of the coupling point N between the tie rod and the knuckle needs to be changed from the arc indicated by the solid line to the arc indicated by the broken line so that the radially inwardly turning wheel (rebounding-side wheel) is displaced to the toe-out side (leftwards in FIG. 20) and the radially outwardly turning wheel (bounding-side wheel) is displaced to the toe-in side (rightwards in FIG. 20), when the vehicle movement changes from a straight-ahead travel to a turn. This change can be achieved simply by an upward displacement of the coupling point C between the tie rod and the steering gear box from point C2 to point C1 in FIG. 20. That is, if a vehicle has a greater understeer tendency during a turn than desired, a desired steer tendency can be achieved by causing an upward displacement of the coupling point between the steering gear box and the tie rod, in some cases.

Although the foregoing embodiments are described based on a generally-termed strut suspension having a strut and a lower arm, the invention is not limited to such a structure, but may also be applied to other various types of suspensions including a double wishbone suspension and the like, in similar manners. That is, the coupling point between the steering gear box and the tie rod is vertically displaced to shift the locus followed by the coupling point between the knuckle and the tie rod so that the toe curve based on the bounding and rebounding states of the wheels is changed. Thus, a desired understeer tendency during a turn can be achieved. In this case, it goes without saying that a direction or a amount of the displacement of the coupling point between the tie rod and the steering gear box should be able to decided according to various types of suspensions or a desired steer tendency.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A steering gear box mounting structure for a vehicle, comprising:

at least one flexible support device for mounting a steering gear box to a vehicle body member; and a flexible support device mounting portion for mounting said flexible support device to said steering gear box, wherein said flexible support device comprises an outer sleeve fixed to said flexible support device mounting portion, an inner sleeve fixed to said vehicle body member, and an elastic body interposed between said inner and outer sleeves and including a hollow space that is displaceable asymmetrically in top-to-bottom directions, and wherein at least one of said outer sleeve and said inner sleeve has an inclined surface inclined with respect to a direction of an axis of said flexible support device, and a portion filled with said elastic body is provided between said inclined surface and the other one of said outer sleeve and said inner sleeve, and said outer sleeve is displaced in said top-to-bottom directions relative to said inner sleeve in accordance with loads applied to said vehicle in left-to-right directions.

2. The steering gear box mounting structure according to claim 1, wherein said flexible support device is mounted to said steering gear box such that an axis of said flexible support device extends substantially parallel to said top-to-bottom directions.

3. The steering gear box mounting structure according to claim 2, wherein said hollow space is asymmetrically formed with respect to a plane that includes an axial center of said flexible support device and is perpendicular to the axis of said flexible support device.

4. The steering gear box mounting structure according to claim 2, wherein a portion of said outer sleeve contacting said elastic body without said hollow space interposed therebetween is asymmetrically formed with respect to a plane that includes an axial center of said flexible support device and is perpendicular to the axis of said flexible support device.

5. The steering gear box mounting structure according to claim 2, wherein said inclined surface is inclined with respect to the left-to-right directions of said vehicle such that said inclined surface is spaced apart from the axis of said flexible support device by a distance that becomes greater toward an axial end portion of said flexible support device.

6. The steering gear box mounting structure according to claim 5, wherein said flexible support device is cylindrically shaped in its axial center portion and is conically shaped in axial end portions thereof.

7. The steering gear box mounting structure according to claim 1, wherein each of said inner sleeve and said elastic body is composed of two members of a substantially identical shape, and said flexible support device has a point-symmetrical configuration with respect to an axial center thereof.

8. The steering gear box mounting structure according to claim 1, wherein said hollow space is formed in said elastic body along a part of a circumference thereof, and said elastic body includes at least one radially extending auxiliary hollow space in an area where said hollow space does not exist.

9. The steering gear box mounting structure according to claim 1, wherein the inclined surface belonging to said inner sleeve is an intermediate plate disposed in said elastic body.

10. The steering gear box mounting structure according to claim 1, wherein said at least one flexible support device comprises a plurality of flexible support devices, and said flexible support devices are arranged such that respective hollow spaces thereof become substantially symmetrical in left-to-right directions among said flexible support devices.

11. The steering gear box mounting structure according to claim 1, wherein the flexible support device is formed integrally with said flexible support device mounting portion.

12. The steering gear box mounting structure according to claim 1, further comprising a fastener that fixes the inner sleeve to said body.

* * * * *